United States Patent
Xiong (10) Patent No.: US 9,467,900 B2
(45) Date of Patent: Oct. 11, 2016

(54) SERVICE SCHEDULING METHOD AND APPARATUS

(71) Applicant: HUAWEI TECHNOLOGIES CO., LTD., Shenzhen (CN)

(72) Inventor: Xin Xiong, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 141 days.

(21) Appl. No.: 14/291,719

(22) Filed: May 30, 2014

(65) Prior Publication Data

US 2014/0314009 A1    Oct. 23, 2014

Related U.S. Application Data

(63) Continuation of application No. PCT/CN2012/085731, filed on Dec. 3, 2012.

(30) Foreign Application Priority Data

Dec. 1, 2011  (CN) .......................... 2011 1 0393150

(51) Int. Cl.
*H04W 4/00* (2009.01)
*H04W 28/16* (2009.01)
(Continued)

(52) U.S. Cl.
CPC ............. *H04W 28/16* (2013.01); *H04W 12/00* (2013.01); *H04W 76/023* (2013.01); *H04W 72/12* (2013.01); *H04W 92/18* (2013.01)

(58) Field of Classification Search
CPC .................................................. H04W 28/04
USPC ....................................................... 370/329
See application file for complete search history.

(56) References Cited

U.S. PATENT DOCUMENTS

| 5,983,072 A | 11/1999 | Schroderus |
| 2010/0189006 A1 | 7/2010 | Mallick et al. |

(Continued)

FOREIGN PATENT DOCUMENTS

| CN | 102204392 | 9/2011 |
| CN | 102395160 | 3/2012 |

(Continued)

OTHER PUBLICATIONS

International Search Report mailed Feb. 7, 2014 in corresponding International Application No. PCT/CN2012/085731.

(Continued)

*Primary Examiner* — Samina Choudhry
(74) *Attorney, Agent, or Firm* — Staas & Halsey LLP (57) ABSTRACT

The present invention discloses a service scheduling method and apparatus, relates to the field of communications systems, and implements communication between user equipments while saving resources of a communications network. The method includes: receiving, by a base station, an amount of data which is sent by a user equipment in paired user equipments by using a buffer status report and needs to be uploaded by the user equipment; then sending, by the base station on a same physical downlink control channel, a transmission resource grant to the user equipment and sending receiving resource allocation allocated by the base station to another user equipment except the equipment; and finally, performing, by the user equipment and the another user equipment, data communication in terminal direct mode respectively according to the transmission resource grant and the receiving resource allocation. The present invention is applied to the field of communications systems.

14 Claims, 7 Drawing Sheets

(51) Int. Cl.
  *H04W 76/02* (2009.01)
  *H04W 12/00* (2009.01)
  *H04W 92/18* (2009.01)
  *H04W 72/12* (2009.01)

(56) References Cited

U.S. PATENT DOCUMENTS

| | | | |
|---|---|---|---|
| 2010/0261469 A1 | 10/2010 | Ribeiro et al. | |
| 2011/0064037 A1 | 3/2011 | Wei et al. | |
| 2011/0237231 A1 | 9/2011 | Horneman et al. | |
| 2011/0268006 A1* | 11/2011 | Koskela | H04W 72/121 370/312 |
| 2012/0106517 A1* | 5/2012 | Charbit | H04W 72/04 370/336 |

FOREIGN PATENT DOCUMENTS

| | | |
|---|---|---|
| EP | 2 360 979 A1 | 8/2011 |
| WO | WO 99/04514 | 1/1999 |
| WO | WO 2009/035301 A2 | 3/2009 |

OTHER PUBLICATIONS

PCT International Search Report and Written Opinion of the International Searching Authority dated Feb. 7, 2013 in corresponding International Patent Application No. PCT/CN2012/085731.

"3$^{rd}$ Generation Partnership Project; Technical Specification Group Radio Access Network; Evolved Universal Terrestrial Radio Access (E-UTRA); Physical layer procedures (Release 10)", 3GPP TS 36.213 V10.3.0, Sep. 2011, pp. 1-122.

Extended and Supplementary European Search Report issued on Sep. 29, 2014 in corresponding European Patent Application No. 12854173.7.

* cited by examiner

| Time division duplex Uplink/downlink Structure | Downlink subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 9

SERVICE SCHEDULING METHOD AND APPARATUS

CROSS-REFERENCE TO RELATED APPLICATION

This application is a continuation of International Application No. PCT/CN2012/085731, filed on Dec. 3, 2012, which claims priority to Chinese Patent Application No. 201110393150.X, filed on Dec. 1, 2011, both of which are hereby incorporated by reference in their entireties.

TECHNICAL FIELD

The present invention relates to the field of communications systems, and in particular, to a service scheduling method and apparatus.

BACKGROUND

Local switch (Local Switch) refers to that a local call that starts and terminates at a same base station or a same group of base stations implements local switch in a wireless network, and may also refer to that a local call that starts and terminates at a same wireless controller (RNC (Radio Network Controller)/BSC (Base Station Controller), or a group of wireless controllers (RNC/BSC) connected to a same MSC (Mobile Switching Center)/SGSN (Serving GPRS SUPPORT NODE) implements local switch in a wireless network, bypassing a backhaul network in which mobile communication traffic is transmitted from a wireless base station to a nearest switch node. If a local switch technology is simply used to implement data transmission between user equipments under a same base station, all data transmission has to be forwarded by a network, resulting in a severe waste of resources in a communications network.

D2D communication (Device to Device communication) refers to direct communication between two terminals without forwarding user data by the network. D2D communication can improve system coverage and network capacity, reduce network construction costs and save precious air interface resources. How to apply D2D communication in an existing cellular network is a problem that needs to be solved.

SUMMARY

Embodiments of the present invention provide a service scheduling method and apparatus, which solve the problem that currently all data transmission has to be forwarded by a network, resulting in a severe waste of resources in a communications network.

Technical solutions adopted by the embodiments of the present invention are as follows:

In one aspect, a service scheduling method in terminal direct mode is provided and includes:

configuring, by a base station when a user equipment establishes a connection, paired user equipments and a group radio network temporary identifier Group RNTI used in resource scheduling, where the paired user equipments include paired user equipments that communicate in terminal direct mode, the paired user equipments include at least two user equipments, and one user equipment of the at least two equipments corresponds to another user equipment except the equipment;

receiving, by the base station, an amount of data which is sent by the user equipment in the paired user equipments by using a buffer status report and needs to be uploaded by the user equipment;

sending, by the base station and on a same physical downlink control channel, a transmission resource grant to the user equipment, and sending receiving resource allocation to another user equipment except the equipment, where control information included in the transmission resource grant sent by the base station to the user equipment is completely the same in content as control information included in the receiving resource assignment sent by the base station to the another user equipment except the user equipment and the transmission resource grant and the receiving resource allocation are scrambled by the base station by using the Group RNTI; and instructing, by the base station, the user equipment to perform data communication in the terminal direct mode according to the transmission resource grant, and the user equipment except the user equipment to perform data communication in the terminal direct mode according to the receiving resource assignment.

In one aspect, a service scheduling apparatus in terminal direct mode is provided and includes:

a configuring unit, adapted to: when a user equipment establishes a connection, configure paired user equipments and a group radio network temporary identifier Group RNTI used in resource scheduling, where the paired user equipments include paired user equipments that communicate in terminal direct mode, the paired user equipments include at least two user equipments, and one equipment of the at least two equipments corresponds to another user equipment except the equipment;

a transceiver unit, adapted to receive an amount of data which is sent, by using a buffer status report, by the user equipment in the paired user equipments configured by the configuring unit and needs to be uploaded by the user equipment, where the transceiver unit is adapted to send, on a same physical downlink control channel, a transmission resource grant to the user equipment, and send receiving resource allocation to another user equipment except the equipment in the paired user equipments configured by the configuring unit; and an instructing unit, adapted to instruct the user equipment and the another user equipment except the equipment to perform data communication in terminal direct mode respectively according to the transmission resource grant sent by the transceiver unit and the receiving resource allocation.

According to the service scheduling method and apparatus in terminal direct mode provided by the embodiments of the present invention, first, when a user equipment establishes a connection, a base station configures paired user equipments and a group radio network temporary identifier Group RNTI used in resource scheduling; the base station receives an amount of data which is sent by the user equipment in the paired user equipments by using a buffer status report and needs to be uploaded by the user equipment; then the base station sends, on a same physical downlink control channel, a transmission resource grant to the user equipment and sends receiving resource allocation to another user equipment except the equipment, where control information indicated by the transmission resource grant and that indicated by the receiving resource allocation are completely the same, and both the transmission resource grant and the receiving resource allocation are scrambled by the base station by using the Group RNTI; finally, the base station instructs the user equipment and the another user equipment except the equipment to perform data communication in terminal direct mode respectively according to the transmission resource grant and the receiving resource allocation. In the prior art, lots of resources in a communications network are consumed when service scheduling is implemented. In the embodiments of the present invention, the base station performs unified scheduling processing on transmission data so as to implement direct communication between user equipments, thereby saving resources in a communications network.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Most trunking services occur under a same base station, and therefore, local switch may be used to implement local communications of the trunking services without consuming transmission resources of a backhaul network. A process thereof is as follows: to transmit data to a second user equipment, a first user equipment first needs to report, by using a buffer status report BSR (buffer status report), an amount of data to be uploaded, then an eNB allocates a suitable uplink grant (UL grant) through a PDCCH (physical downlink control channel), and the UE transmits uplink data over an uplink shared channel (UL-SCH) according to the instruction of the UL grant. If the first user equipment and the second user equipment are in a same cell, the eNB directly places the received uplink data in a downlink buffer and performs downlink scheduling on the second user equipment without involving interaction with a core network.

If the local switch technology is simply used to implement data transmission between user equipments under a same base station, all data transmission has to be forwarded by a network, resulting in a severe waste of resources in a communications network. To solve the foregoing technical problem, the present invention provides a technical solution used in terminal direct mode.

The terminal direct mode according to the present invention may be used in direct mode for trunking communications, and may also be used for terminal direct D2D communication in a universal long term evolution system LTE. The direct mode enables direct data transmission between two parties in communication with the support of a network; therefore, precious air interface resources may be saved. For ease of description, D2D communication, which is more common, is used as an example in subsequent descriptions. To make advantages of the technical solutions of the present invention clearer, the present invention is described in detail with reference to accompanying drawings and the embodiments in the following.

Figure 1:
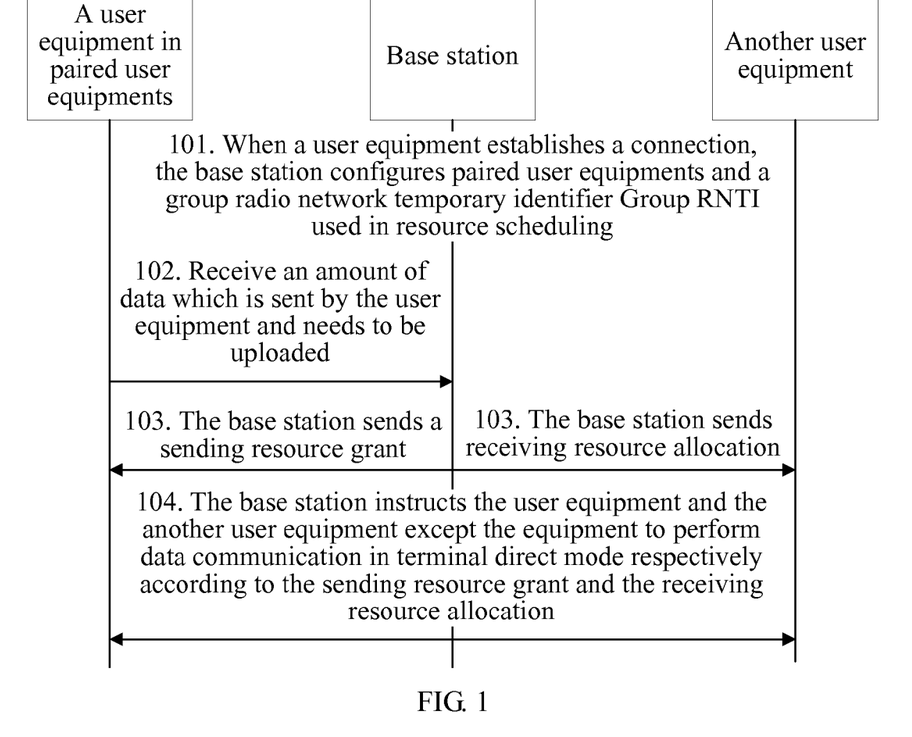
FIG. 1 is a flowchart of a service scheduling method according to the present invention.

The present invention provides a service scheduling method, and as shown in FIG. 1, the method includes:

101: When a user equipment establishes a connection, a base station configures paired user equipments and a group radio network temporary identifier Group RNTI used in resource scheduling.

The paired user equipments include paired user equipments that communicate in terminal direct mode, the paired user equipments include at least two user equipments, where one equipment of the at least two user equipments corresponds to another user equipment except the equipment.

Specifically, when the user equipment is a low power node at a fixed location, the base station receives a service request initiated by the another user equipment except the equipment.

The base station obtains the user equipment nearest to the another user equipment except the equipment according to the service request, and pairs the user equipment with the another user equipment except the equipment.

Alternatively, when the user equipment is a low power node at a fixed location, the base station sends a broadcast notification message to the another user equipment except the equipment, where the broadcast notification message includes a content classification index that is stored by the fixed low power node and used for obtaining the another user equipment of a same type as the fixed low power node and the Group RNTI that is used by the base station to scramble a transmission resource grant and receiving resource allocation during resource scheduling, so that the another user equipment except the equipment directly obtains a user equipment paired with the another user equipment except the equipment according to the broadcast notification message.

102: The base station receives an amount of data which is sent by the user equipment in the paired user equipments by using a buffer status report and needs to be uploaded by the user equipment.

103: The base station sends, on a same physical downlink control channel, a transmission resource grant to the user equipment and sends receiving resource allocation to the another user equipment except the equipment.

Control information included in the transmission resource grant sent by the base station to the user equipment is completely the same in content as control information included in the receiving resource assignment sent by the base station to the another user equipment except the user equipment, and the transmission resource grant and the receiving resource allocation are scrambled by the base station by using the Group RNTI.

104: The base station instructs the user equipment and the another user equipment except the equipment to perform data communication in terminal direct mode respectively according to the transmission resource grant and the receiving resource allocation.

When communication in terminal direct mode is performed, a DCI (Downlink Control Information) format needs to be added on the physical downlink control channel and is used for identification of data in terminal direct mode. Resource allocation of data in terminal direct mode is performed by the base station; therefore, the DCI format of the data in terminal direct mode does not need to carry information such as resource allocation (resource allocation) and a modulation and coding scheme (MCS, modulation and coding scheme), since the information has been configured in step 103.

A physical downlink control channel of a subframe where the data in terminal direct mode is located is scrambled by the user equipment by using a D-RNTI and is used by the another user equipment except the equipment to determine whether the data in terminal direct mode is sent by the user equipment.

The number of the second user equipment in the present invention may also be n, where n is a positive integer. The base station instructs the first user equipment and the second user equipment to perform data communication in terminal direct mode respectively according to the transmission resource grant and the receiving resource allocation.

In the prior art, lots of resources in a communications network are consumed when service scheduling is implemented. In the embodiment of the present invention, the base station performs unified scheduling processing on transmission data so as to implement direct communication between user equipments, thereby saving resources in a communications network.

Figure 2:
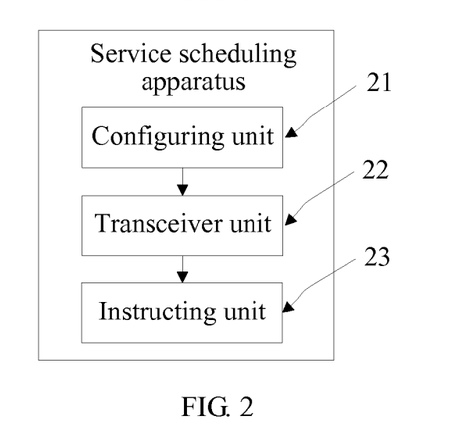
FIG. 2 is a schematic structural diagram of a service scheduling apparatus according to the present invention.

The present invention provides a service scheduling apparatus, and as shown in FIG. 2, the apparatus includes: a configuring unit 21, a transceiver unit 22, and an instructing unit 23.

The configuring unit 21 is adapted to configure, by a base station when a user equipment establishes a connection, paired user equipments and a group radio network temporary identifier Group RNTI used in resource scheduling, where the paired user equipments include paired user equipments that communicate in terminal direct mode, the paired user equipments include at least two user equipments, and one equipment of the at least two equipments corresponds to another equipment except the equipment.

Specifically, when the user equipment is a low power node at a fixed location, the base station receives a service request initiated by the another user equipment except the equipment.

The base station obtains the user equipment nearest to the another user equipment except the equipment according to the service request, and pairs the user equipment with the another user equipment except the equipment.

Alternatively, when the user equipment is a low power node at a fixed location, the base station sends a broadcast notification message to the another user equipment except the equipment, where the broadcast notification message includes a content classification index that is stored by the fixed low power node and used for obtaining the another user equipment of a same type as the fixed low power node and the Group RNTI that is used by the base station to scramble a transmission resource grant and receiving resource allocation during resource scheduling, so that the another user equipment except the equipment directly obtains a user equipment paired with the another user equipment except the equipment according to the broadcast notification message.

The transceiver unit 22 is adapted to receive an amount of data which is sent, by using a buffer status report, by the user equipment in the paired user equipments configured by the configuring unit 21 and needs to be uploaded by the user equipment.

The transceiver unit 22 is adapted to send, on a same physical downlink control channel, a transmission resource grant to the user equipment and send receiving resource allocation to the another user equipment except the equipment in the paired user equipments configured by the configuring unit.

Control information included in the transmission resource grant sent by the base station to the user equipment is completely the same in content as control information included in the receiving resource assignment sent by the base station to the another user equipment except the user equipment, and the transmission resource grant and the receiving resource allocation are scrambled by the base station by using the Group RNTI.

The instructing unit 23 is adapted to instruct the user equipment and the another user equipment except the equipment to perform data communication in terminal direct mode respectively according to the transmission resource grant and the receiving resource allocation.

When communication is performed in terminal direct mode, a DCI (Downlink Control Information) format needs to be added on the physical downlink control channel to be used for identification of data in terminal direct mode. Resource allocation of the data in terminal direct mode is performed by the base station; therefore, the DCI format of the data does not need to carry information such as resource allocation (resource allocation) and a modulation and coding scheme (MCS, modulation and coding scheme), since the information has been configured in step 103.

A physical downlink control channel of a subframe where the data in terminal direct mode is located is scrambled by the user equipment by using a D-RNTI and is used by the another user equipment except the equipment to determine whether the data in terminal direct mode is sent by the user equipment.

The number of the another user equipment in the present invention may also be n, where n is a positive integer. The base station instructs the user equipment and other user equipments to perform data communication in terminal direct mode respectively according to the transmission resource grant and the receiving resource allocation.

In the prior art, lots of resources in a communications network are consumed when service scheduling is implemented. In the embodiment of the present invention, the base station performs unified scheduling processing on transmission data so as to implement direct communication between user equipments, thereby saving resources in a communications network.

Figure 3:
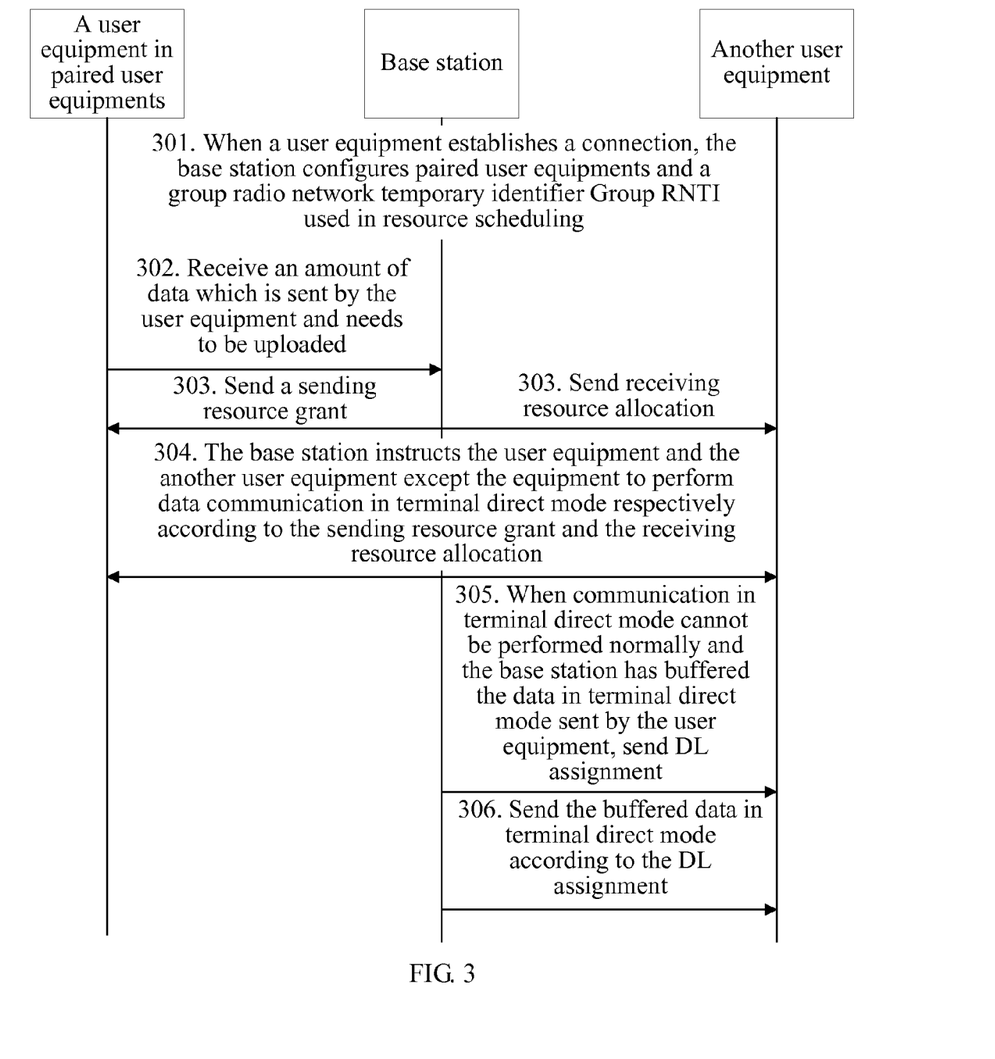
FIG. 3 is a flowchart of another service scheduling method according to the present invention.

The present invention provides another service scheduling method. As shown in FIG. 3, steps 301 to 304 of the method are similar to steps 101 to 104 of the method shown in FIG. 1, and a difference is that this method further includes:

305: When communication in terminal direct mode cannot be performed normally and the base station has buffered the data in terminal direct mode sent by the user equipment, the base station performs DL assignment for the another user equipment except the equipment by using a physical downlink control channel that is scrambled by using an C-RNTI of the another user equipment except the equipment.

306: The base station sends the buffered data to the another user equipment except the equipment according to the DL assignment of the another user equipment except the equipment.

In the prior art, lots of resources in a communications network are consumed when service scheduling is implemented. In the embodiment of the present invention, the base station performs unified scheduling processing on transmission data so as to implement direct communication between user equipments, thereby saving resources in a communications network.

Figure 4:
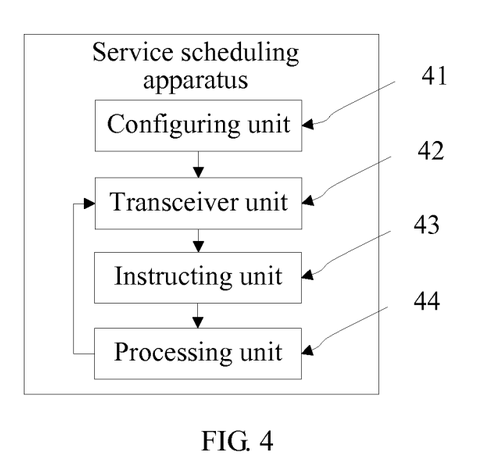
FIG. 4 is a schematic structural diagram of another service scheduling apparatus according to the present invention.

The present invention provides another service scheduling apparatus. As shown in FIG. 4, units 41 to 43 of the apparatus are similar to units 21 to 23 of the apparatus shown in FIG. 2, and a difference is that this apparatus further includes: a processing unit 44.

The processing unit 44 is adapted to: when communication in terminal direct mode cannot be performed normally and the base station has buffered the data in terminal direct mode sent by the user equipment, perform DL assignment for the another user equipment except the equipment by using a physical downlink control channel that is scrambled by using an C-RNTI of the another user equipment except the equipment.

The transceiver unit 42 is further adapted to send the buffered data to the another user equipment except the equipment, according to the DL assignment of the another user equipment except the equipment, which is processed by the processing unit 44.

In the prior art, lots of resources in a communications network are consumed when service scheduling is implemented. In the embodiment of the present invention, the base station performs unified scheduling processing on transmission data so as to implement direct communication between user equipments, thereby saving resources in a communications network.

Figure 5:
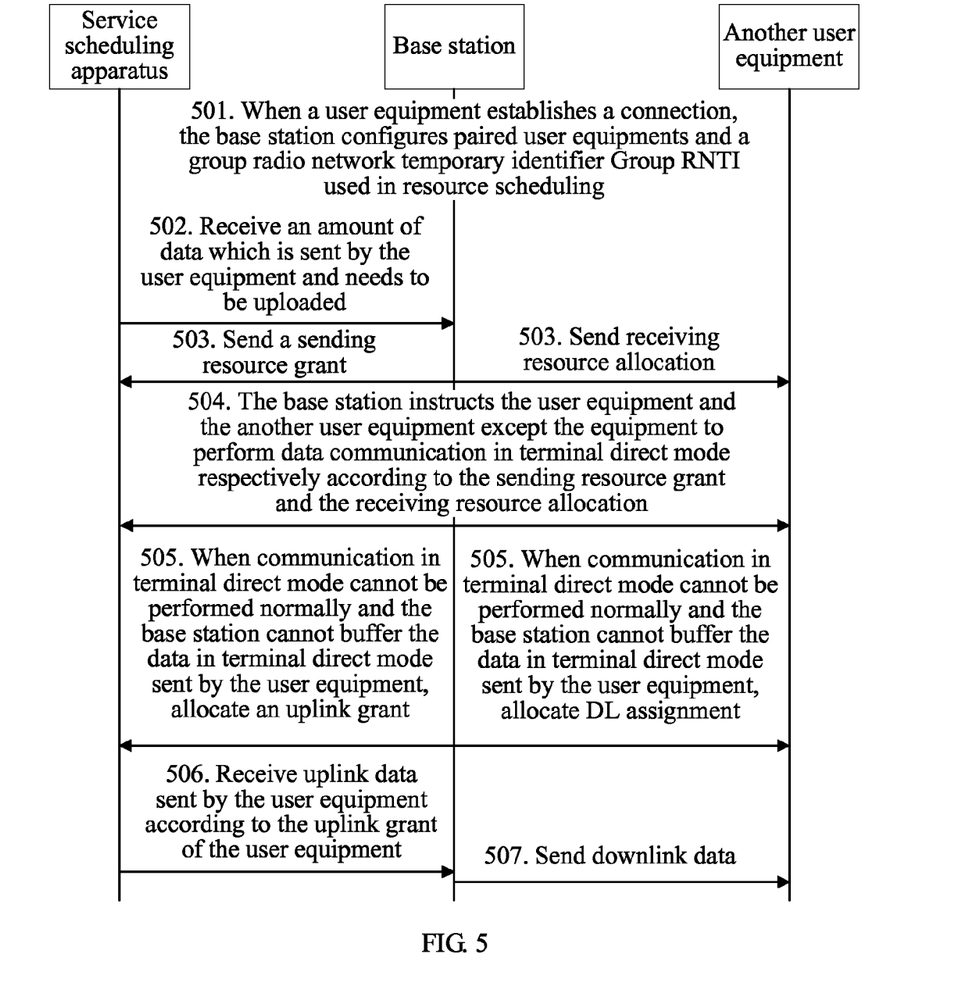
FIG. 5 is a flowchart of still another service scheduling method according to the present invention.

The present invention provides still another service scheduling method. As shown in FIG. 5, steps 501 to 504 of the method are similar to steps 101 to 104 of the method shown in FIG. 1, and a difference is that this method further includes:

505: When communication in terminal direct mode cannot be performed normally and the base station cannot buffer the data in terminal direct mode sent by the user equipment, the base station performs scheduling for the paired user equipments in a manner of enhanced local switch (local switch), the base station scrambles a physical downlink control channel shared by the user equipment and the another user equipment except the equipment by using a group radio network temporary identifier (Group L-RNTI) used for local switch, and allocates an uplink grant of the user equipment and DL assignment of the another user equipment except the equipment.

Particularly, if there is a trunking communications system, a user equipment always operates in a half-duplex manner, and therefore, for a same cell, sending content of the user equipment in sending state and receiving content of the another user equipment in receiving state except the equipment are the same. Therefore, on a basis of local switch, step 505 may be further optimized.

For a trunking communications system, control information included in the transmission resource grant sent by the base station to the user equipment is completely the same in content as control information included in the receiving resource assignment sent by the base station to the another user equipment except the user equipment, where the transmission resource grant and the receiving resource allocation are indicated by the shared physical downlink control channel. In this way, the transmission resource grant and the receiving resource allocation may use the same physical downlink control channel and contain the same control information content, thereby further saving scheduling resources.

506: The base station receives uplink data sent by the user equipment according to the uplink grant of the user equipment.

507: The base station sends, according to the DL assignment, a preset subframe of the physical downlink control channel, and sends downlink data to the another user equipment except the equipment. The preset subframe is a sum of a time interval between the uplink grant and uplink data transmission and a time interval between uplink data reception by the base station and downlink data transmission performed by the base station.

Specifically, after sending the preset subframe, the base station sends the downlink data to the second user equipment according to the DL assignment.

Figure 9:
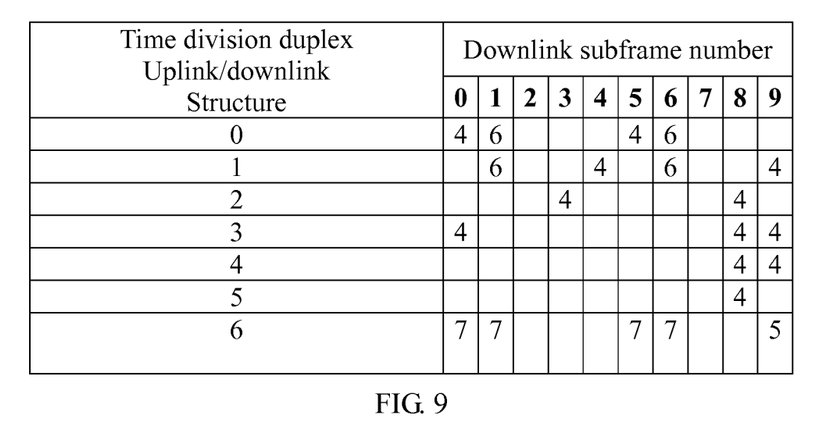
FIG. 9 is a diagram of values of k in time division duplex.

In a current standard, the physical downlink control channel and the downlink data are in a same subframe. In the present invention, resource allocation of the downlink data is performed by using the physical downlink control channel shared by uplink transmission and downlink transmission, therefore, in the embodiment of the present invention, a timing relationship between the physical downlink control channel and the downlink data complies with a rule of n+k+k1, where n is a subframe where the physical downlink control channel is located, k1 is a time interval between uplink data reception by the base station to downlink data transmission performed by the base station, a value of k in frequency division duplex FDD is 4, and a value of k in time division duplex TDD is shown in FIG. 9.

In the prior art, lots of resources in a communications network are consumed when service scheduling is implemented. In the embodiment of the present invention, the base station performs unified scheduling processing on transmission data so as to implement direct communication between user equipments, thereby saving resources in a communications network.

Figure 6:
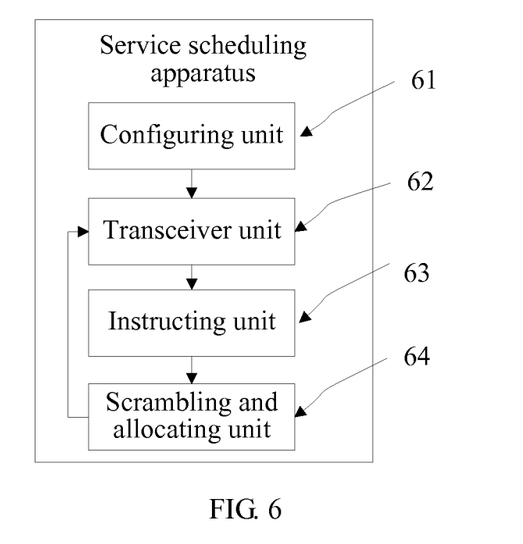
FIG. 6 is a schematic structural diagram of still another service scheduling apparatus according to the present invention.

The present invention provides still another service scheduling apparatus. As shown in FIG. 6, units 61 to 63 of the apparatus are similar to units 21 to 23 of the apparatus shown in FIG. 2, and a difference is that this apparatus further includes: a scrambling and allocating unit 64.

The scrambling and allocating unit 64 is adapted to: when communication in terminal direct mode cannot be performed normally and the base station cannot buffer the data in terminal direct mode sent by the user equipment, perform scheduling for the paired user equipments in a manner of enhanced local switch (local switch); after scrambling, by the base station by using a group identifier Group L-RNTI used for local switch, a physical downlink control channel shared by the user equipment and the another user equipment except the equipment, allocate an uplink grant of the user equipment and DL assignment of the another user equipment except the equipment. Particularly, for a trunking communications system, the transmission resource grant and the receiving resource allocation use a same physical downlink control channel and contain same control information content.

The transceiver unit 62 is adapted to receive uplink data sent by the user equipment according to the uplink grant of the user equipment allocated by the scrambling and allocating unit 64.

The transceiver unit 62 is adapted to send downlink data to the another user equipment except the equipment according to the DL assignment allocated by the scrambling and allocating unit 64.

In the prior art, lots of resources in a communications network are consumed when service scheduling is implemented. In the embodiment of the present invention, the base station performs unified scheduling processing on transmission data so as to implement direct communication between user equipments, thereby saving resources in a communications network.

Figure 7:
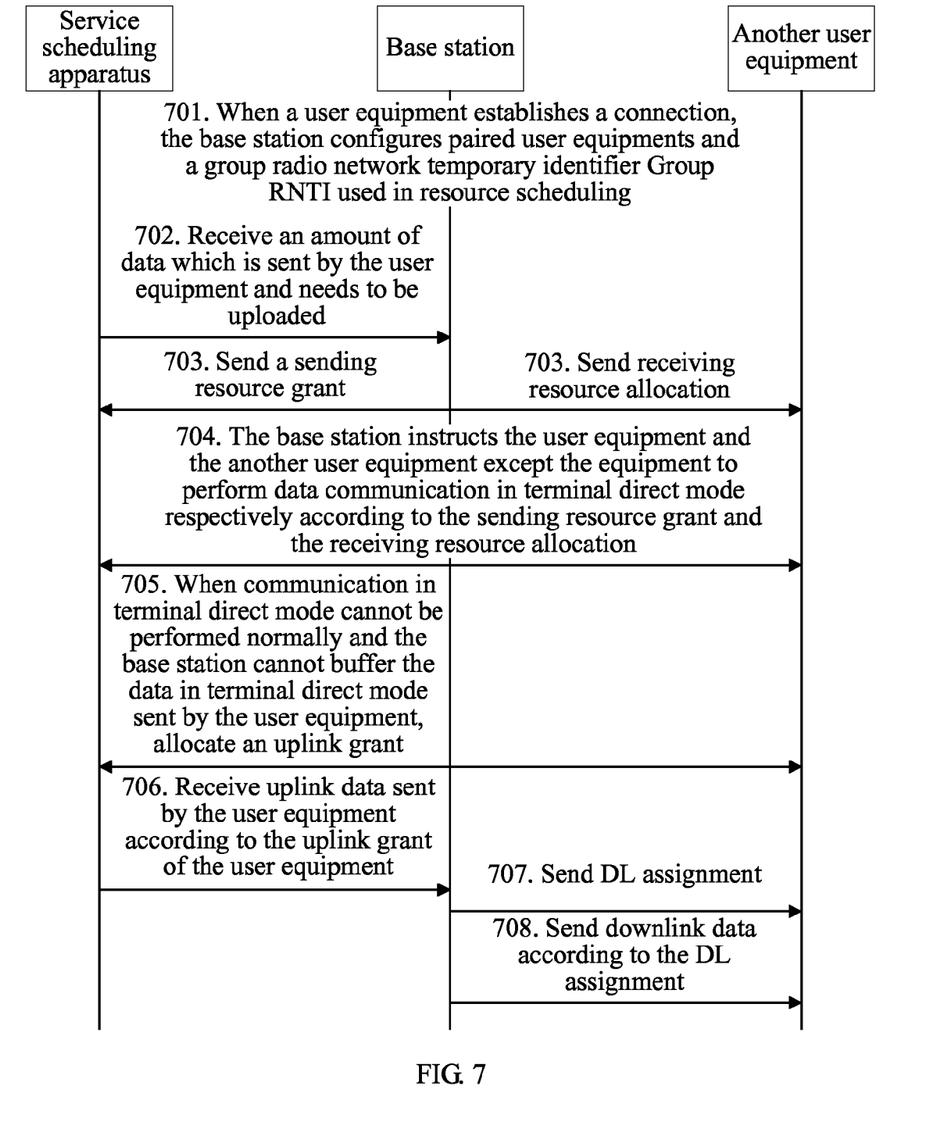
FIG. 7 is a flowchart of yet another service scheduling method according to the present invention.

The present invention provides yet another service scheduling method. As shown in FIG. 7, steps 701 to 704 of the method are similar to steps 101 to 104 of the method shown in FIG. 1, and a difference is that this method further includes:

705: When communication in terminal direct mode cannot be performed normally and the base station cannot buffer the data in terminal direct mode sent by the user equipment, the base station allocates an uplink grant of the user equipment according to a physical downlink control channel scrambled by the user equipment by using a cell radio network temporary identifier C-RNTI.

706: The base station receives uplink data sent by the user equipment according to the uplink grant of the user equipment.

707: The base station performs DL assignment of the another user equipment except the equipment by using a physical downlink control channel scrambled by using a C-RNTI of the another user equipment except the equipment.

708: The base station sends downlink data to the another user equipment except the equipment according to the DL assignment.

In the prior art, lots of resources in a communications network are consumed when service scheduling is implemented. In the embodiment of the present invention, the base station performs unified scheduling processing on transmission data so as to implement direct communication between user equipments, thereby saving resources in a communications network.

Figure 8:
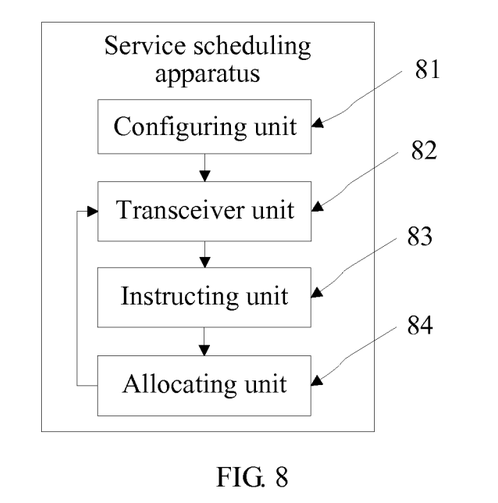
FIG. 8 is a schematic structural diagram of yet another service scheduling apparatus according to the present invention.

The present invention provides yet another service scheduling apparatus. As shown in FIG. 8, units 81 to 83 of the apparatus are similar to units 21 to 23 of the apparatus shown in FIG. 2, and a difference is that this apparatus further includes: an allocating unit 84.

The allocating unit 84 is adapted to: when communication in terminal direct mode cannot be performed normally and the base station cannot buffer the data in terminal direct mode sent by the user equipment, allocate an uplink grant of the user equipment according to a physical downlink control channel scrambled by the user equipment by using a cell radio network temporary identifier C-RNTI.

The transceiver unit 82 is adapted to receive uplink data sent by the user equipment according to the uplink grant of the user equipment allocated by the allocating unit 84.

The allocating unit 84 is adapted to perform DL assignment of the another user equipment except the equipment by using a physical downlink control channel scrambled by using a cell radio network temporary identifier of the another user equipment except the equipment.

The transceiver unit 82 is adapted to send downlink data to the another user equipment except the equipment according to the DL assignment allocated by the allocating unit 84.

According to the service scheduling methods and apparatuses in terminal direct mode provided by the embodiments of the present invention, first, when a user equipment establishes a connection, a base station configures paired user equipments and a group radio network temporary identifier Group RNTI used in resource scheduling; the base station receives an amount of data which is sent by the user equipment in the paired user equipments by using a buffer status report and needs to be uploaded by the user equipment; then the base station sends, on a same physical downlink control channel, a transmission resource grant to the user equipment and sends receiving resource allocation to another user equipment except the equipment, where control information indicated by the transmission resource grant and that indicated by the receiving resource allocation are completely the same, and both the transmission resource grant and the receiving resource allocation are scrambled by the base station by using the Group RNTI; finally, the base station instructs the user equipment and the another user equipment except the equipment to perform data communication in terminal direct mode respectively according to the transmission resource grant and the receiving resource allocation. In the prior art, lots of resources in a communications network are consumed when service scheduling is implemented. In the embodiments of the present invention, the base station performs unified scheduling processing on transmission data so as to implement direct communication between user equipments, thereby saving resources in a communications network.

The service scheduling apparatuses provided by the embodiments of the present invention can implement the foregoing method embodiments, and for specific function implementation, reference may be made to descriptions in the method embodiments, which are not described herein again. The service scheduling methods and apparatuses provided by the embodiments of the present invention may be applied to the field of communications systems, but are not limited thereto.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory), or a random access memory (Random Access Memory).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service scheduling method, comprising:
    configuring, by a base station when a user equipment establishes a connection, paired user equipments and a group radio network temporary identifier (Group RNTI) used in resource scheduling, wherein the paired user equipments communicate in terminal direct mode, the paired user equipments comprise at least two user equipments, and one user equipment of the at least two user equipments corresponds to another user equipment other than the one user equipment;

receiving, by the base station, an amount of data which is sent by the one user equipment in the paired user equipments by using a buffer status report, the amount of data to be uploaded by the one user equipment;

sending, by the base station and on a same physical downlink control channel, a transmission resource grant to the one user equipment, and sending receiving resource allocation to the another user equipment other than the one user equipment, wherein control information comprised in the transmission resource grant sent by the base station to the another user equipment other than the one user equipment is the same as control information comprised in the receiving resource allocation sent by the base station to the one user equipment, and the transmission resource grant and the receiving resource allocation are scrambled by the base station by using the Group RNTI; and instructing, by the base station, the one user equipment and the another user equipment other than the one user equipment to perform data communication in terminal direct mode respectively according to the transmission resource grant and the receiving resource allocation.

2. A service scheduling method, comprising:

configuring, by a base station when a user equipment establishes a connection, paired user equipments and a group radio network temporary identifier (Group RNTI) used in resource scheduling, wherein the paired user equipments communicate in terminal direct mode, the paired user equipments comprise at least two user equipments, and one user equipment of the at least two user equipments corresponds to another user equipment other than the one user equipment;

receiving, by the base station, an amount of data which is sent by the one user equipment in the paired user equipments by using a buffer status report, the amount of data to be uploaded by the one user equipment;

sending, by the base station and on a same physical downlink control channel, a transmission resource grant to the one user equipment, and sending receiving resource allocation to the another user equipment other than the one user equipment, wherein control information comprised in the transmission resource grant sent by the base station to the another user equipment other than the one user equipment is the same as control information comprised in the receiving resource allocation sent by the base station to the one user equipment, and the transmission resource grant and the receiving resource allocation are scrambled by the base station by using the Group RNTI;

instructing, by the base station, the one user equipment and the another user equipment other than the one user equipment to perform data communication in terminal direct mode respectively according to the transmission resource grant and the receiving resource allocation; and sending, by the base station, a direct-radio network temporary identifier (D-RNTI) to the one user equipment and the another user equipment other than the one user equipment by using a medium access control (MAC) sub-layer protocol MAC layer control unit, wherein the D-RNTI is carried on a physical downlink shared channel of a subframe where the physical downlink control channel is located, so that a physical downlink control channel (PDCCH) where a subframe sent by the user equipment is located is scrambled by using the D-RNTI, the PDCCH does not comprise resource allocation and a modulation and coding scheme, and the another user equipment other than the one user equipment identifies the paired user equipments by descrambling the D-RNTI.

3. The method according to claim 1, wherein the configuring, by a base station when a user equipment establishes a connection, the paired user equipments comprises:

when the one user equipment is a low power node at a fixed location, receiving, by the base station, a service request initiated by the another user equipment other than the one user equipment; and obtaining, by the base station, the one user equipment nearest to the another user equipment other than the one user equipment according to the service request, and pairing the one user equipment with the another user equipment other than the one user equipment.

4. The method according to claim 1, wherein the configuring, by a base station when a user equipment establishes a connection, the paired user equipments and the group radio network temporary identifier (Group RNTI) used in resource scheduling comprises:

when the one user equipment is a low power node at a fixed location, sending, by the base station, a broadcast notification message to the another user equipment other than the one user equipment, wherein the broadcast notification message comprises a content classification index that is stored by the fixed low power node and used for obtaining a user equipment of a same type as the fixed low power node and the Group RNTI that is used by the base station to scramble the transmission resource grant and the receiving resource allocation during resource scheduling, so that the another user equipment other than the one user equipment directly obtains a user equipment paired with the another user equipment other than the one user equipment according to the broadcast notification message.

5. The method according to claim 1, wherein the method further comprises:

when communication in terminal direct mode cannot be performed normally and the base station has buffered the data in terminal direct mode that is sent by the one user equipment, performing, by the base station, DL assignment for the another user equipment other than the one user equipment by using a physical downlink control channel that is scrambled by using an RNTI of the another user equipment other than the one user equipment; and sending, by the base station, the buffered data to the another user equipment other than the one user equipment according to the DL assignment of the another user equipment other than the one user equipment.

6. The method according to claim 1, wherein the method further comprises:

when communication in terminal direct mode cannot be performed normally and the base station cannot buffer the data in terminal direct mode that is sent by the one user equipment, scrambling, by the base station by using a group identifier (Group L-RNTI) used for local switch, the physical downlink control channel shared by the one user equipment and the another user equipment other than the one user equipment, and allocating an uplink grant for the one user equipment and DL assignment for the another user equipment other than the one user equipment;

receiving, by the base station, uplink data sent by the user equipment according to the uplink grant of the one user equipment; and sending, by the base station according to the DL assignment, a preset subframe of the physical downlink control channel, and sending downlink data to the another user equipment other than the one user equipment, wherein the preset subframe is a sum of a time interval between the uplink grant and uplink data transmission and a time interval between uplink data reception by the base station and downlink data transmission performed by the base station.

7. The method according to claim 5, wherein the method further comprises:

for a trunking communications system, control information comprised in the transmission resource grant sent by the base station to the another user equipment other than the one user equipment is the same as control information comprised in the receiving resource allocation sent by the base station to the one user equipment, wherein the transmission resource grant and the receiving resource allocation are indicated by the shared physical downlink control channel.

8. The method according to claim 1, wherein the method further comprises:

when communication in terminal direct mode cannot be performed normally and the base station cannot buffer the data in terminal direct mode sent by the one user equipment, allocating, by the base station, an uplink grant of the one user equipment according to a physical downlink control channel scrambled by the one user equipment by using a cell radio network temporary identifier (C-RNTI);

receiving, by the base station, uplink data sent by the one user equipment according to the uplink grant of the one user equipment;

performing, by the base station, DL assignment of the another user equipment other than the one user equipment by using a physical downlink control channel scrambled by using a radio network temporary identifier of the another user equipment other than the one user equipment; and sending, by the base station, downlink data to the another user equipment other than the one user equipment according to the DL assignment.

9. A service scheduling apparatus, comprising:

a processor, configured to configure, by a base station when a user equipment establishes a connection, paired user equipments and a group radio network temporary identifier (Group RNTI) used in resource scheduling, wherein the paired user equipments communicate in terminal direct mode, the paired user equipments comprise at least two user equipments, and one user equipment of the at least two user equipments corresponds to another user equipment other than the one user equipment;

a transmitter, configured to receive an amount of data which is sent, by using a buffer status report, by the one user equipment in the paired user equipments configured by the processor, the amount of data to be uploaded by the one user equipment, wherein the transmitter is configured to send, on a same physical downlink control channel, a transmission resource grant to the one user equipment, and send receiving resource allocation to the another user equipment other than the one user equipment in the paired user equipments configured by the processor; and the processor, configured to instruct the one user equipment and the another user equipment other than the one user equipment to perform data communication in terminal direct mode respectively according to the transmission resource grant sent by the transmitter and the receiving resource allocation.

10. The apparatus according to claim 9, wherein:

the transmitter is specifically configured to: when the one user equipment is a low power node at a fixed location, receive a service request initiated by the another user equipment other than the one user equipment; and the transmitter is specifically adapted to obtain the one user equipment nearest to the another user equipment other than the one user equipment according to the service request received, and pair the one user equipment with the another user equipment other than the one user equipment.

11. The apparatus according to claim 9, wherein:

the transmitter is specifically configured to: when the one user equipment is a low power node at a fixed location, send a broadcast notification message to the another user equipment other than the one user equipment, wherein the broadcast notification message comprises a content classification index that is stored by the fixed low power node and used for obtaining a user equipment of a same type as the fixed low power node and a Group RNTI that is scramble the transmission resource grant and the receiving resource allocation during resource scheduling, so that the another user equipment other than the one user equipment directly obtains a user equipment paired with the another user equipment other than the one user equipment according to the broadcast notification message.

12. The apparatus according to claim 9, wherein:

the processor is further configured to: when communication in terminal direct mode cannot be performed normally and the base station has buffered the data in terminal direct mode sent by the one user equipment, perform DL assignment for the another user equipment other than the one user equipment by using a physical downlink control channel that is scrambled by using an C-RNTI of the another user equipment other than the one user equipment; and the transmitter is further adapted to send the buffered data to the another user equipment other than the one user equipment according to the DL assignment of the another user equipment other than the one user equipment, which is processed by the processor.

13. The apparatus according to claim 9, wherein:

the processor is further configured to: when communication in terminal direct mode cannot be performed normally and the base station cannot buffer the data in terminal direct mode sent by the one user equipment, perform scheduling for the paired user equipments in a manner of enhanced local switch (local switch); after scrambling, using a group identifier (Group L-RNTI) used for local switch, the physical downlink control channel shared by the one user equipment and the another user equipment other than the one user equipment, allocate an uplink grant for the one user equipment and DL assignment for the another user equipment other than the one user equipment;

the transmitter is further configured to receive uplink data sent by the one user equipment according to the uplink grant of the one user equipment allocated by the processor; and the transmitter is further configured to send downlink data to the another user equipment other than the one user equipment according to the DL assignment allocated by the processor.

14. The apparatus according to claim 9, wherein:

the processor is further configured to: when communication in terminal direct mode cannot be performed normally and the base station cannot buffer the data in terminal direct mode sent by the one user equipment, allocate an uplink grant of the one user equipment according to a physical downlink control channel scrambled by the one user equipment by using a cell radio network temporary identifier (C-RNTI);

the transmitter is further configured to receive uplink data sent by the one user equipment according to the uplink grant of the one user equipment allocated by the processor;

the processor is further configured to perform DL assignment of the another user equipment other than the one user equipment by using a physical downlink control channel scrambled by using a radio network temporary identifier of the another user equipment other than the one user equipment; and the transmitter is further configured to send downlink data to the another user equipment other than the one user equipment according to the DL assignment allocated by the processor.

* * * * *